United States Patent [19]

Toda et al.

[11] Patent Number: 4,667,021
[45] Date of Patent: May 19, 1987

[54] CHROMIUM COMPLEX COMPOUND

[75] Inventors: Junji Toda, Tokyo; Eiichi Ogawa, Kasukabe, both of Japan

[73] Assignee: Nippon Kayaku Kabushiki Kaisha, Tokyo, Japan

[21] Appl. No.: 654,665

[22] Filed: Sep. 26, 1984

[30] Foreign Application Priority Data

Oct. 4, 1983 [JP] Japan .................. 58-184373

[51] Int. Cl.$^4$ .............. C09B 45/26; C09B 62/095; D06P 1/10; D06P 1/382
[52] U.S. Cl. .................. 534/625; 534/605; 534/725; 534/861
[58] Field of Search ............ 534/605, 625, 709

[56] References Cited

U.S. PATENT DOCUMENTS 2,963,472 12/1960 Seitz et al. .................. 534/625 X
3,185,676 5/1965 Klein .......................... 534/602
3,519,614 7/1970 Ponzini ....................... 534/625 X

FOREIGN PATENT DOCUMENTS 2634308 2/1977 Fed. Rep. of Germany ...... 534/605

Primary Examiner—Floyd D. Higel
Attorney, Agent, or Firm—Cushman, Darby & Cushman

[57] ABSTRACT

A chromium complex compound represented as the free acid form by the formula (I):

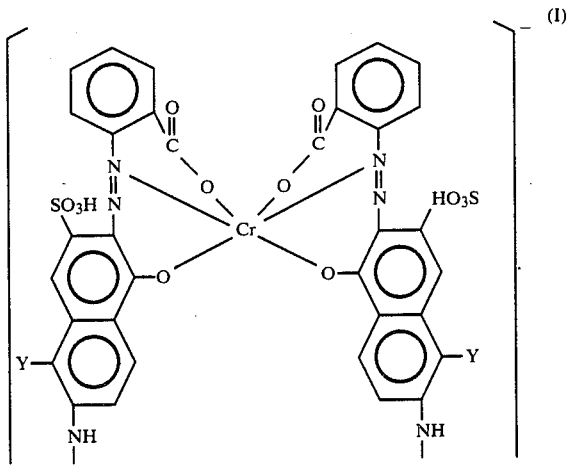

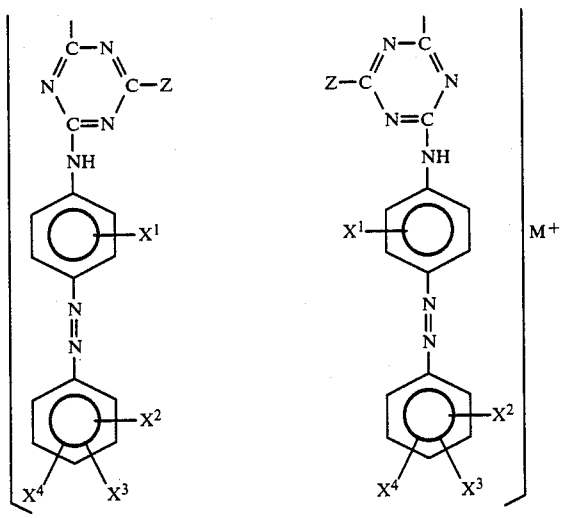

wherein $X^1$ represents a hydrogen atom, a methyl group, a methoxy group or a sulfonic acid group; $X^2$, $X^3$ and $X^4$ represent independently a hydrogen atom, a chlorine atom, a methyl gorup, a methoxy group, a carboxyl group or a sulfonic acid group; Y represents a hydrogen atom or a sulfonic acid group; Z represents a chlorine atom, a fluorine atom or $-N^{30}(R)_3$ (R represents a $C_1$ to $C_4$-alkyl group),

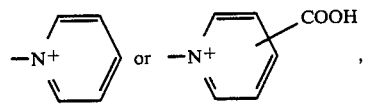

and M represents a hydrogen atom or an alkali metal, a process for producing the chromium complex compound (I) and a method for dyeing cellulosic fibers with the same. The chromium complex compound represented by formula (I) is excellent in affinity to cellulosic fibers and in color-yield, build-up properties and fastness properties. These compounds are dyes for cellulosic fibers.

3 Claims, No Drawings

CHROMIUM COMPLEX COMPOUND

DETAILED EXPLANATION OF THE INVENTION

The present invention relates to a chromium complex compound, a process for producing the chromium complex compound and a method for dyeing cellulosic fibers with the same. More in detail, the present invention relates to a chromium complex compound represented as the free acid form by the formula (I):

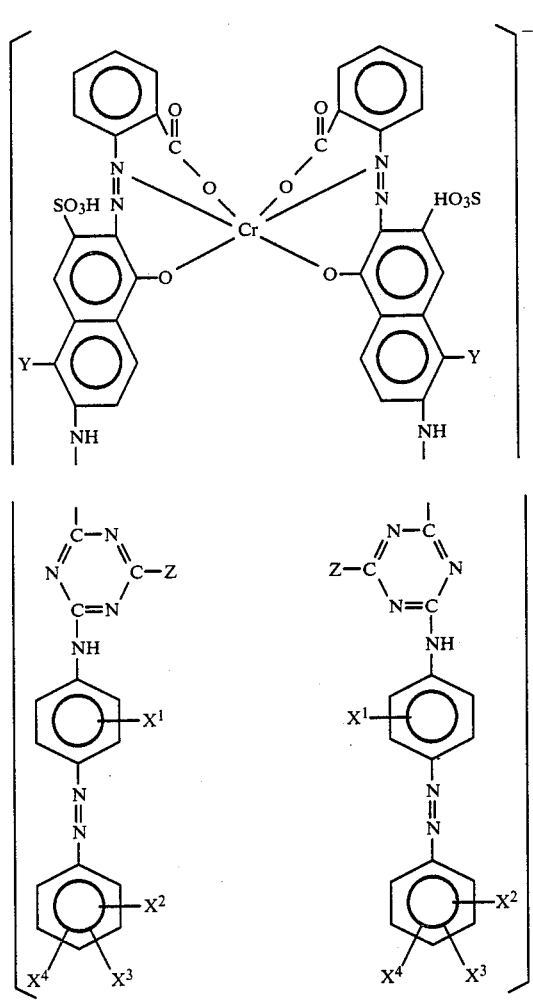

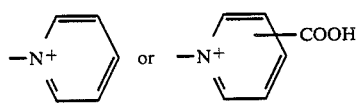

wherein $X^1$ represents a hydrogen atom, a methyl group, a methoxy group or a sulfonic acid group; $X^2$, $X^3$ and $X^4$ independently represent a hydrogen atom, a chlorine atom, a methyl group, a methoxy group, a carboxyl group or a sulfonic acid group; Y represents a hydrogen atom or a sulfonic acid group; Z represents a chlorine atom, a fluorine atom, $-N^+(R)_3$ (R represents a $C_1$ to $C_4$-alkyl group), and M represents a hydrogen atom or an alkali metal, a process for producing the chromium complex compound, and a method for dyeing cellulosic fibers with the same.

Since a dyestuff derived from a metal complex compound obtained by treating a compound of O,O'-dihydroxyazo compounds or O-carboxy-O'-hydroxyazo compounds with a metal such as copper, chromium and the like gives a dyed fibrous material with excellent fastness to light and perspiration, such a dyestuff is broadly utilized as direct dyestuffs, acid dyestuffs or reactive dyestuffs. Of the various metals used in such a metallic complexation, a chromium compound gives a metal complex compound showing a big bathochromic effect (effect of shifting a maximum absorption ($\lambda_{max}$) to a longer wave length side) and accordingly, the complexation by a chromium compound is a means preferably used for the purpose of obtaining a complex compound showing a deep hue.

However, although a reactive dyestuff derived from a chromium complex compound obtained by treating, for instance, an aminoazo compound (described in Japanese Patent Publication No. 42-21020) represented by the formula (II):

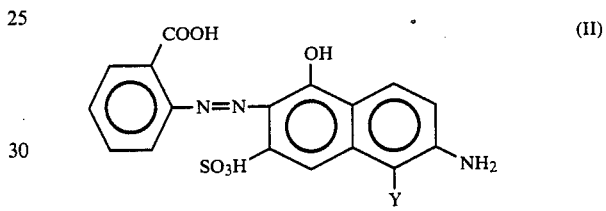

wherein Y represents the same as defined above with a chromium compound is excellent in fastness, such a reactive dyestuff is poor in affinity to cellulosic fibers and accordingly, the reactive dyestuff is not provided with a sufficient quality for use in dip dyeing of cellulosic fiber.

As a result of the present inventors' studies for finding a dyestuff excellent in affinity to cellulosic fibers and in colour-yield and build-up properties without impairing the merit as a chromium complex dyestuff, it has been found by the present inventors that the compound represented by the formula (I) is excellent in these properties, and, basing on this finding, the present invention has been accomplished.

In the first aspect of the present invention, there is provided a chromium complex compound represented by the formula (I).

In the second aspect of the present invention, there is provided a process for producing a chromium complex compound represented by the formula (I), which comprises condensing 2 moles of cyanuric chloride or cyanuric fluoride with 1 mole of a chromium complex compound, as a free acid form, obtained from an aminoazo compound represented by the formula (II):

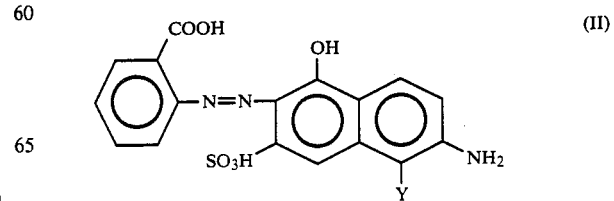

wherein Y represents the same as defined above; and 2 moles of an aminoazo compound represented by the formula (III):

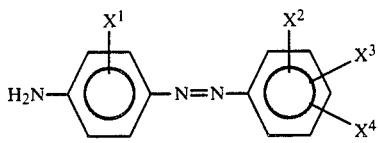

wherein $X^1$, $X^2$, $X^3$ and $X^4$ respectively represent the same as defined above in any order (first and second condensation), and then condensing, if necessary, thus obtained chromium complex product with $N(R)_3$ (R represents the same as defined above),

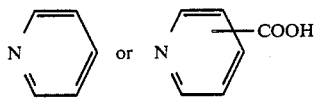

(third condensation).

In the third aspect of the present invention, there is provided a process for producing a chromium complex compound represented as the free acid form by the formula (I), which comprises condensing cyanuric chloride or cyanuric fluoride with a compound represented by the formula (II) and a compound represented by the formula (III) in any order (first and second condensation), and then chromium-complexing the thus obtained condensation product with a chromium compound, and furthermore condensing, if necessary, the thus obtained chromium complex product with $N(R)_3$ (R represents the same as defined above),

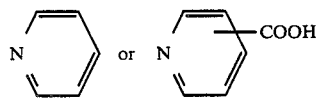

(third condensation).

In the fourth aspect of the present invention, there is provided a method for dyeing a cellulosic fibers, which comprises dyeing the cellulosic fibers with a chromium complex compound represented by the formula (I).

In the above-mentioned synthetic process, the chromium-complexing is carried out according to the following method, for instance, a method of treating an aqueous solution of an aminoazo compound represented by the formula (II) or a compound which is obtained by condensing cyanuric chloride or cyanuric fluoride with a compound of the formula (II) and a compound of the formula (III) with a chromium compound such as chromium sulfate, chromium formate, chromium acetate and chromium chloride in a weakly acidic to weakly alkaline state, preferably at a pH 4 to 9 under heating, preferably at a temperature of from 50° C. to the boiling point of the aqueous solution. And the condensation (first, second or third condensation) of cyanuric chloride or fluoride with an aminoazo compound represented by the formula (II), an aminoazo compound represented by the formula (III), a chromium complex compound obtained from an aminoazo compound represented by the formula (II), $N(R)_3$ (R represents the same as defined above),

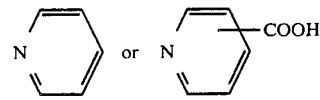

can be conducted in any of conventional methods, but preferred reaction conditions are as follows:

The first condensation may be conducted at a temperature of 0° to 25° C., particularly 5° to 15° C. and at a pH of 3 to 7, particularly 4 to 6.5.

The second condensation may be conducted at a temperature of 40° to 80° C., particularly 50° to 70° C. and at a pH of 5 to 8, particularly 6 to 7.

The third condensation may be conducted at a temperature of 70° to 105° C., particularly 80° to 100° C. and at a pH of 2 to 7, particularly 3 to 6.

As the aminoazo compound represented by the formula (II), 2-amino-6-(2'-carboxyphenylazo)-5-naphthol-7-sulfonic acid or 2-amino-6-(2'-carboxyphenylazo)-5-naphthol-1,7-disulfonic acid is mentioned.

As the aminoazo compound represented by the formula (III), the following compounds may be exemplified:

4-aminoazobenzene; 4-amino-2'-methylazobenzene; 4-amino-3'-methylazobenzene; 4-amino-4'-methylazobenzene; 4-amino-2'-methoxyazobenzene; 4-amino-3'-methoxyazobenzene; 4-amino-4'-methoxyazobenzene; 4-amino-2'-chloroazobenzene; 4-amino-3'-chloroazobenzene; 4-amino-4'-chloroazobenzene; 4-amino-2'-methoxy-4',6'-dimethylazobenzene; 4-aminoazobenzene-2'-sulfonic acid; 4-aminoazobenzene-3'-sulfonic acid; 4-aminoazobenzene-4'-sulfonic acid; 4-aminoazobenzene-2'-carboxylic acid; 4-aminoazobenzene-3'-carboxylic acid; 4-aminoazobenzene-4'-carboxylic acid; 4-aminoazobenzene-2',5'-disulfonic acid; 4-amino-5'-chloroazobenzene-2'-sulfonic acid; 4-amino-2',5'-dichloroazobenzene-4'-sulfonic acid; 4-amino-4',6'-dichloroazobenzene-2'-sulfonic acid; 4-amino-4',6'-dimethylazobenzene-2'-sulfonic acid; 4-amino-2'-methyl-6'-chloroazobenzene-4'-sulfonic acid; 4-aminoazobenzene-3,2'-disulfonic acid; 4-aminoazobenzene-3,3'-disulfonic acid; 4-aminoazobenzene-3,4'-disulfonic acid; 4-aminoazobenzene-3,2',5'-trisulfonic acid; 4-amino-5'-chloroazobenzene-3,2'-disulfonic acid; 4-aminoazobenzene-3-sulfonic acid; 4-amino-3-methylazobenzene-2'-sulfonic acid; 4-amino-3-methylazobenzene-3'-sulfonic acid; 4-amino-3-methylazobenzene-4'-sulfonic acid; 4-amino-3-methylazobenzene-2',5'-disulfonic acid; 4-amino-2-methylazobenzene-4'-sulfonic acid; 4-amino-2-methylazobenzene-3'-sulfonic acid; 4-amino-2-methylazobenzene-2',5'-disulfonic acid; 4-amino-3-methoxyazobenzene-3'-sulfonic acid; 4-amino-3-methoxyazobenzene-4'-sulfonic acid and 4-amino-3-methoxyazobenzene-2',5'-disulfonic acid.

Further, for obtaining the complex compound represented by the formula (I) wherein Z represents $-N^{+/}(R)_3$ (R is the same as above),

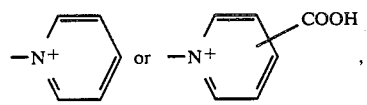

trimethylamine, triethylamine, tributylamine or the like as a tertiary aliphatic amine, pyridine, pyridine-3-carboxylic acid or pyridine-4-carboxylic acid is used.

When Z represents —N+(R)₃ (R is the same as above),

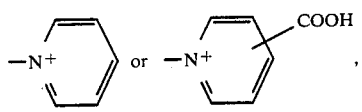

a negatively-charged anion generally is present to counterbalance the positive charge.

M of the formula (I) represents a hydrogen atom or an alkali metal such as sodium, potassium and lithium. A chromium complex compound of the formula (I) can be isolated by a conventional method. For example, the reaction solution containing a chromium complex compound of the formula (I) is concentrated by evaporation or the product is salted out, separated by filtration and dried as usual.

Of the chromium complex compounds represented by the formula (I), more desirable compounds are as follows:

(i) A chromium complex compound wherein Y is a hydrogen atom; Z is a chlorine atom, a fluorine atom or

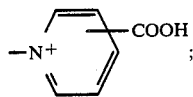

$X^1$, $X^2$, $X^3$, $X^4$ and M are the same as defined above.

Particularly preferred chromium complex compounds are compounds wherein Y is a hydrogen atom; Z is a chlorine atom; $X^1$, $X^2$, $X^3$, $X^4$ and M are the same as defined above.

(ii) A chromium complex compound wherein Y is a sulfonic acid group; Z is a chlorine atom or a fluorine atom; $X^1$, $X^2$ and $X^3$ each is a hydrogen atom; $X^4$ is a sulfonic acid group (P- to an azo group); M is Na.

The chromium complex compound according to the present invention is suitable for dyeing a natural cellulosic fiber such as cotton and hemp, a regenerated cellulosic fiber such as viscose rayon and cupro rayon, and the actual dyeing is carried out in a weakly acidic to alkaline medium in the presence of an acid binder, for instance, sodium hydrogen carbonate, sodium metaphosphate, trisodium phosphate, sodium orth- or methasilicate, sodium carbonate or sodium hydroxide.

Methods for dyeing cellulosic fibers by a chromium complex compound of the formula (I) according to the present invention are further explained as follows.

In the case of carrying out dyeing with a relatively large bath ratio as in the case of batchwise dip dyeing, a dye bath is prepared from one or more of the chromium complex compounds according to the present invention and an inorganic salt such as sodium chloride and sodium sulfate, and after carrying out dyeing at a temperature of 30° to 130° C. for 10 to 60 min., an acid binder is added to the dye bath and dyeing is further carried out at a temperature of 30° to 130° C. for 20 to 60 min. For reference, the acid binder may be added at the beginning of the dyeing to the dye bath. In addition, in another method, after treating the fibrous material in a dye bath not-containing an acid binder, the thus treated material is treated in a separate bath containing the acid binder and the inorganic salt, thereby the dyestuff is firmly fixed to the fibrous material.

In the case of carrying out dyeing with a relatively small bath ratio as a continuous dyeing method or semi-continuous dyeing method, a dye bath is prepared by using one or more of the chromium complex compounds according to the present invention, an acid binder, a penetrant and, in the case of necessity, urea, and after immersing a fibrous material into the dye bath for a short time and squeezing the fibrous material taken out from the dye bath, the fibrous material is left as it is at room temperature or under a heated state, or the fibrous material is treated for a short time by wet-heating or dry-heating. In some cases, after preliminarily immersing a fibrous material in a solution of an acid binder, the thus treated fibrous material may be padded in a neutral dye bath not-containing the acid binder and then left as it is at room temperature or to be thermally treated. Or else, inversely, after padding a fibrous material to be dyed in a neutral dye bath, the fibrous material may be treated with a solution which has been saturated by the inorganic salt and contains the acid binder and then left as it is at room temperature or to be thermally treated.

Furthermore, an ordinary printing can be carried out by using one or more of the chromium complex compounds according to the present invention.

The chromium complex compounds according to the present invention exhibit an excellent colour-yields and build-up properties when applied in dyeing cellulosic fibers, and the thus dyed fibers are excellent in fastness, particularly fastnesses to light, perspiration and chlorine water and accordingly, the industrial value of the chromium complex compounds according to the present invention is of remarkable merit.

The present invention will be explained more in detail while referring to the non-limitative examples as follows.

For reference, "part" in Examples means "part by weight" and the maximum absorption of the compounds has been measured by dissolving the compound in a 20% aqueous pyridine solution, and the sulfonic acid group and the carboxyl group in Examples are shown in a free acid form.

EXAMPLE 1

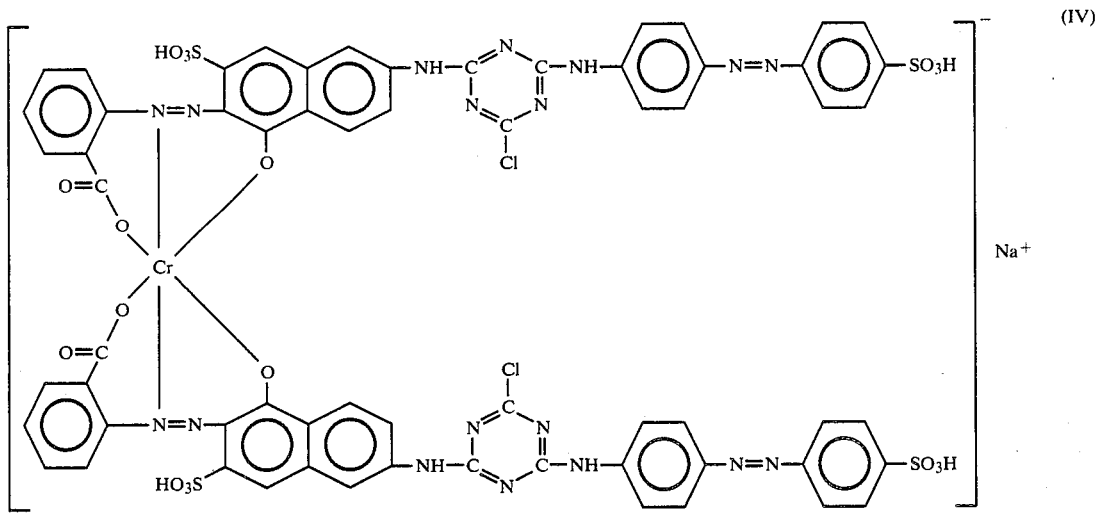

Synthesis

In 50 parts of ice water, 0.1 part of a dispersing agent (Liponox NA, made by Lion Co., Ltd.) and 3.7 parts of cyanuric chloride were added, and the mixture was stirred for 30 min. to obtain an aqueous dispersion. Into the aqueous dispersion, about 100 parts of an aqueous solution containing a chromium complex compound obtained by subjecting 7.7 parts of 2-amino-6-(2'-carboxyphenylazo)-5-naphthol-7-sulfonic acid to a chromium complexing reaction were added dropwise within 30 min. while keeping the aqueous dispersion at a temperature of lower than 10° C. Just after starting of the addition, the resulting mixture was neutralized to pH 7 by an aqueous solution of sodium carbonate, and stirred further for about one hour.

Then, 5.5 parts of 4-aminoazobenzene-4'-sulfonic acid were added to the neutralized mixture, and after heating the mixture to 50° C., the heated mixture was neutralized to pH 7 by an aqueous solution of sodium carbonate, and the neutralized mixture was stirred for 1.5 hours. The crystals precipitated by adding 20% (on the weight of the reaction mixture) of sodium chloride to the neutralized mixture were collected by filtration and dried at 60° C. to obtain a brown compound represented by the formula (IV) shown above. The compound showed two maximum absorptions at 380 and 525 nm.

Dyeing

A dye bath was prepared by using 2 parts of the chromium complex compound represented by the formula (IV), 80 parts of anhydrous sodium sulfate and 1000 parts of water, and after immersing 50 parts of a knitted cotton fabric in the dye bath at 80° C. for 30 min, 20 parts of sodium carbonate were added to the dye bath and dyeing was further carried out at 80° C. for 60 min.

After taking the fabric out from the dye bath and washing the fabric with water, the washed fabric was subjected to soaping in 1000 parts of an aqueous solution containing 2 parts of an anionic surfactant at 95° to 100° C. for 10 min, then washed with water and dried to obtain a dyed cotton fabric of dark brown hue and fastness of the dyed cotton fabric was as follows.

Colour fastness to light (Japanese Industrial Standards, JIS L 0842) is rating 4 to 5.

Colour fastness to perspiration (JIS L 0888 B method, alkaline) is rating 4 to 5.

Colour fastness to chlorine water (ISO/R 105, IV Part 1) is rating 4.

EXAMPLES 2 TO 10

In the similar manner as in Example 1, the chromium complex compounds represented by the following general formula (I-a) and respectively shown in Table 1 were synthesized, and using each of the thus obtained chromium complex compounds, a cotton fabric was dyed in the similar manner in Example 1, the maximum absorptions (nm) of each compound and the hue of the dyed cotton fabric by each of the compound being shown also in Table 1.

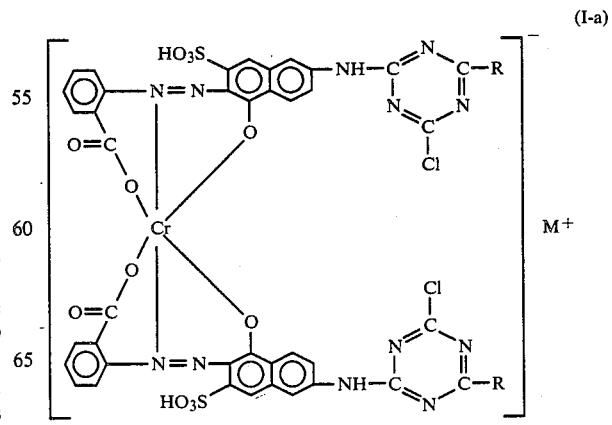

TABLE 1

| Example | R in the formula (I-a) | M | Maximum absorptions (nm) | Hue of dyed cotton fabric |
|---------|------------------------|---|--------------------------|---------------------------|
| 2 | NH—⟨C6H4⟩—N=N—⟨C6H5⟩ | Na | 380 and 525 | Brown |
| 3 | NH—⟨C6H4⟩—N=N—⟨C6H3(SO3H)(HO3S)⟩ | Na | 385 and 525 | Brown |
| 4 | NH—⟨C6H4⟩—N=N—⟨C6H2(CH3)(SO3H)(Cl)⟩ | K | 380 and 525 | Brown |
| 5 | NH—⟨C6H3(OCH3)⟩—N=N—⟨C6H4—SO3H⟩ | Li | 390 and 520 | Brown |
| 6 | NH—⟨C6H3(SO3H)⟩—N=N—⟨C6H4—SO3H⟩ | H | 390 and 520 | Brown |
| 7 | NH—⟨C6H3(CH3)⟩—N=N—⟨C6H4—SO3H⟩ | Na | 380 and 523 | Brown |
| 8 | NH—⟨C6H3(SO3H)⟩—N=N—⟨C6H4—OCH3⟩ | Na | 390 and 525 | Brown |
| 9 | NH—⟨C6H3(SO3H)⟩—N=N—⟨C6H4—COOH⟩ | Na | 390 and 525 | Brown |
| 10 | NH—⟨C6H4⟩—N=N—⟨C6H3(Cl)(SO3H)⟩ | Na | 385 and 525 | Brown |

EXAMPLE 11

In the similar procedure as in Example 1 except for using 2-amino-6-(2'-carboxyphenylazo)-5-naphthol-1,7-disulfonic acid instead of 2-amino-6-(2'-carboxyphenylazo)-5-naphthol-7-sulfonic acid used in Example 1, a brown chromium complex compound represented by the formula (V) was obtained. (Maximum absorptions: 380, 518 nm)

complex compound represented by the formula (VI). (Maximum absorptions: 380, 518 nm)

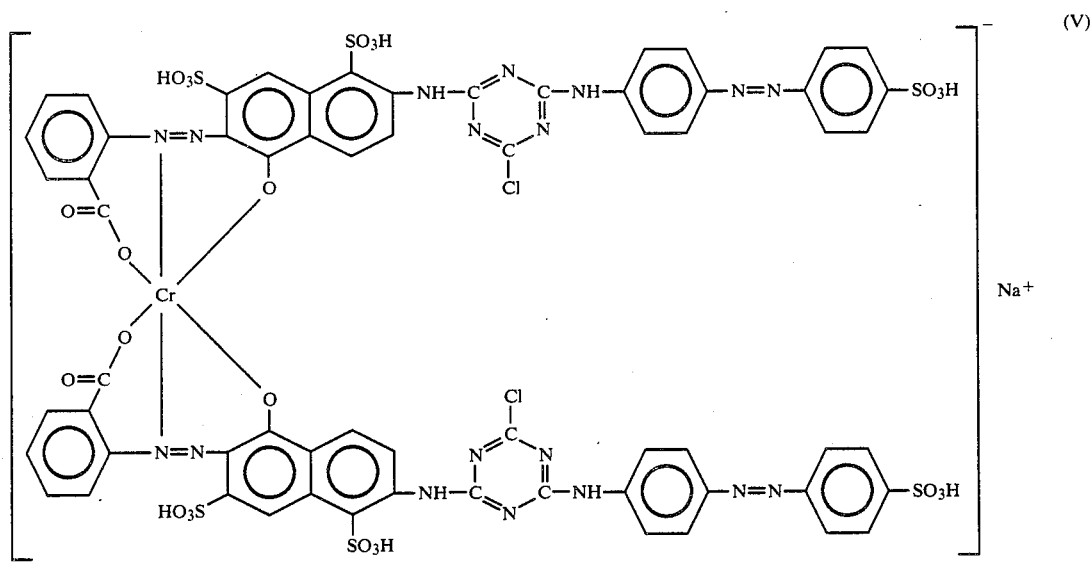

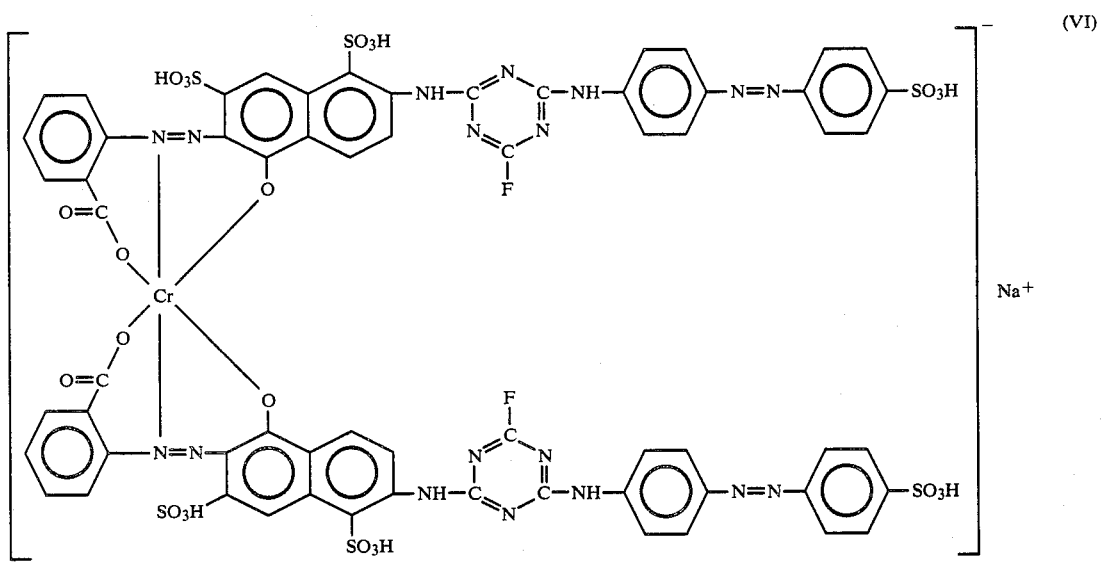

EXAMPLE 12

About 100 parts of an aqueous solution containing chromium complex compound obtained by subjecting 9.3 parts of 2-amino-6-(2'-carboxyphenylazo)-5-naphthol-1,7-disulfonic acid to a chromium complexing reaction were cooled to a temperature of lower than 5° C., and 2.7 parts of cyanuric fluoride were added to the solution. After neutralizing the mixture to pH 7 by an aqueous solution of sodium carbonate, the neutralized mixture was stirred for 30 min.

To the thus obtained mixture, 5.5 parts of 4-aminoazobenzene-4'-sulfonic acid were added, and while neutralizing the mixture by an aqueous solution of sodium carbonate, the mixture was stirred at 10° C. for 1 hr. The crystals precipitated by adding sodium chloride to the mixture were collected by filtration and dried at room temperature to obtain a brown chromium

EXAMPLE 13

To 100 parts of ice water, 7.1 parts of 4-aminoazobenzene-2',5'-disulfonic acid and 2.7 parts of cyanuric fluoride were added, and the mixture was neutralized to pH 7 by an aqueous solution of sodium carbonate at a temperature of lower than 5° C. and stirred for 30 min. To the thus obtained mixture, about 100 parts of an aqueous solution containing a chromium complex compound obtained by subjecting 7.7 parts of 2-amino-6-(2'-carboxyphenylazo)-5-naphthol-7-sulfonic acid to chromium complexing reaction were added, and while neutralizing the mixture to pH 7 by an aqueous solution of sodium carbonate, the mixture was stirred at 10° C. for 1 hr. The crystals precipitated by an addition of sodium chloride to the reaction mixture were collected by filtration and dried at room temperature to obtain a brown chromium complex compound represented by the formula (VII). (Maximum absorptions: 385, 524 nm)

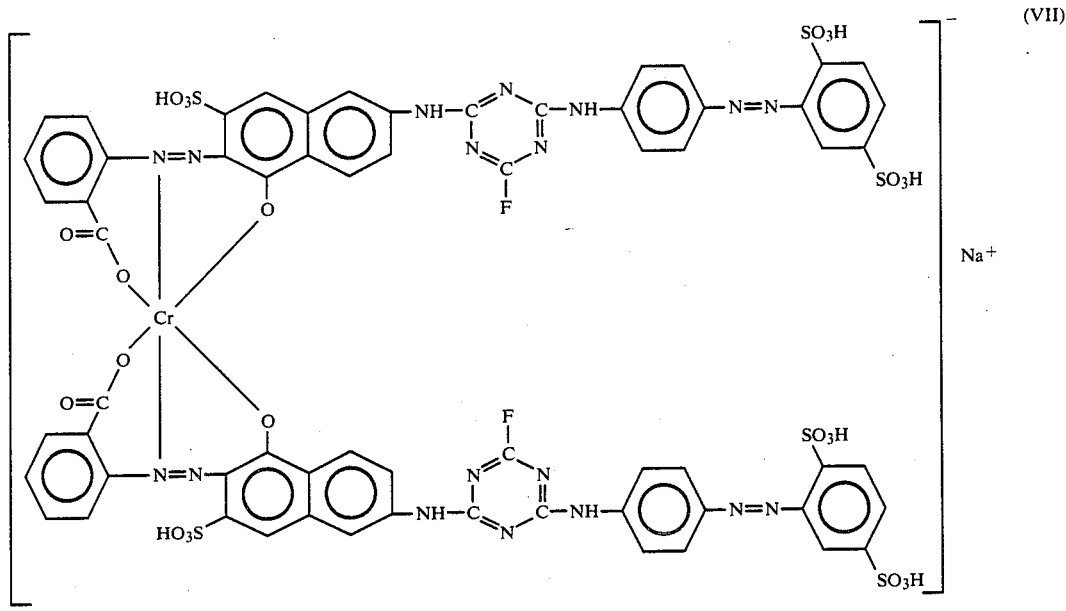

EXAMPLE 14

To 300 parts of water, 17 parts of the chromium complex compound represented by the formula (IV) (Example 1) and 3.7 parts of nicotinic acid were added at pH 6.0, the mixture was heated to 90° C. and stirred for 10 hours at the temperature. The crystals precipitated by adding sodium chloride to the reaction solution were collected by filtration and dried at 80° C. to obtain a brown chromium complex compound represented by the formula (VIII). (Maximum absorptions: 380, 525 nm)

mium complex compounds and the hue of each of the dyed cotton fabrics are shown also in Table 2.

TABLE 2

| Example | Amine | Maximum absorptions (nm) | Hue of dyed cotton |
|---|---|---|---|
| 15 | Pyridine | 380 and 525 | Brown |
| 16 | Isonicotinic acid | 380 and 525 | Brown |
| 17 | Trimethylamine | 380 and 525 | Brown |
| 18 | Tri-n-butylamine | 380 and 525 | Brown |

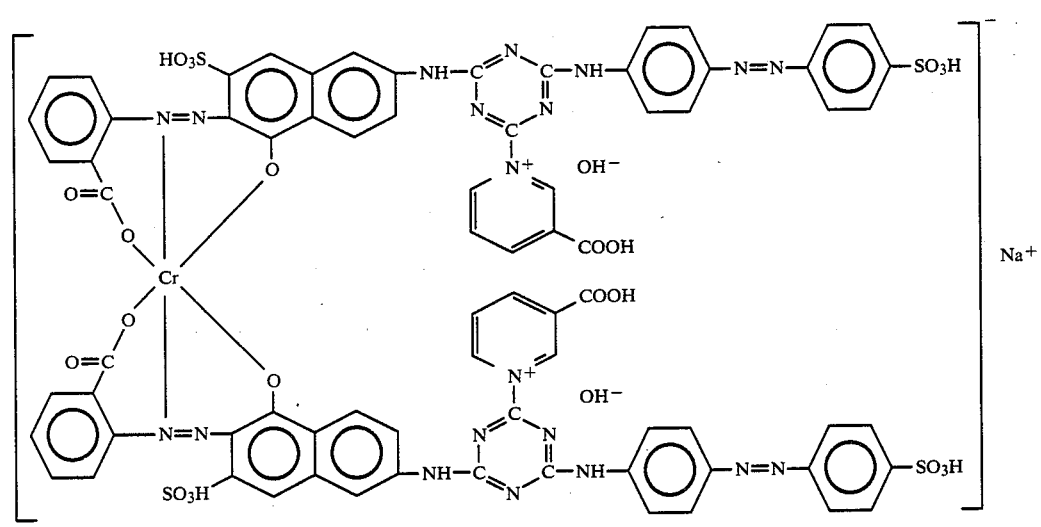

EXAMPLES 15 TO 18

The chromium complex compounds were synthesized in the similar manner as in Example 14 except for using the respective amines shown in Table 2 instead of nicotinic acid in Example 14, and a cotton fabric was dyed with each of the thus obtained chromium complex compounds in the similar manner as in Example 22 shown later. Amines used in Examples, the respective maximum absorption (nm) of the thus obtained chro-

EXAMPLE 19

A pad bath comprising 10 parts of the chromium complex compound represented by the formula (V) (Example 11), one part of sodium alginate, 50 parts of urea, 2 parts of a reduction-inhibitor (Polimine L new, made by Nippon Kayaku Co., Ltd.), 20 parts of sodium carbonate and 917 parts of water was prepared, and a non-silketted cotton broadcloth was padded in the padding liquor. The padded cloth was squeezed by a mangle to a squeeze rate of 60%, and after drying the cloth at 100° C. for 2 min, the dried cloth was thermally treated at 150° C. for 3 min. Then, the thermally treated cloth was subjected to soaping in the same manner as in Example 1, washed with water and dried to obtain a dyed cotton broadcloth of deep brown hue with excellent fastnesses to light, perspiration and chlorine water.

EXAMPLE 20

One thousand parts of a dyeing paste comprising 30 parts of the chromium complex compound prepared in Example 6, 500 parts of a 5% aqueous solution of sodium alginate, 100 parts of urea, 10 parts of Polimine L new, 20 parts of sodium hydrogen carbonate and 340 parts of water were printed on a silketted cotton broadcloth, and after drying the printed cloth at 60° C. for 10 min., the cloth was subjected to steaming at 100° C. for 10 min.

Thereafter, the steamed broadcloth was subjected to soaping, washed and dried in the same maanner as in Example 1 to obtain a printed broadcloth of a deep brown hue with excellent fastnesses to light, perspiration and chlorine water.

EXAMPLE 21

A dye bath was prepared by using 2 parts of the chromium complex compound represented by the formula (VI) (Example 12), 80 parts of anhydrous sodium sulfate and 918 parts of water, and 50 parts of a knitted cotton cloth were immersed in the dye bath at 60° C. for 30 min. Then, 20 parts of sodium carbonate were added into the bath, and dyeing was continued further for 60 min. at the same temperature. The dyed cloth was subjected to soaping in the same manner as in Example 1 to obtain a deep brown dyed cloth with excellent fastnesses to light, perspiration and chlorine water.

EXAMPLE 22

A dye bath comprising 2 parts of the chromium complex compound represented by the formula (VIII) (Example 14), 80 parts of anhydrous sodium sulfate, one part of sodium m-nitrobenzenesulfonate(Anti-oxidation agent), 2 parts of disodium hydrogen phosphate, 0.5 part of potassium dihydrogen phosphate and 914.5 parts of water was prepared. Into the dye bath showing a pH of 7, 50 parts of a knitted cotton cloth were immersed.

The bath was heated to 130° C. within 30 min, while stirring and the dyeing of the cloth was carried out at the temperature of 130° C. for 60 min. The dyed cloth was subjected to soaping, washed and dried in the same manner as in Example 1 to obtain a deep brown dyed cloth with excellent fastnesses to light, perspiration and chlorine water.

What is claimed is:

1. A chromium complex compound represented in the free acid form by the formula:

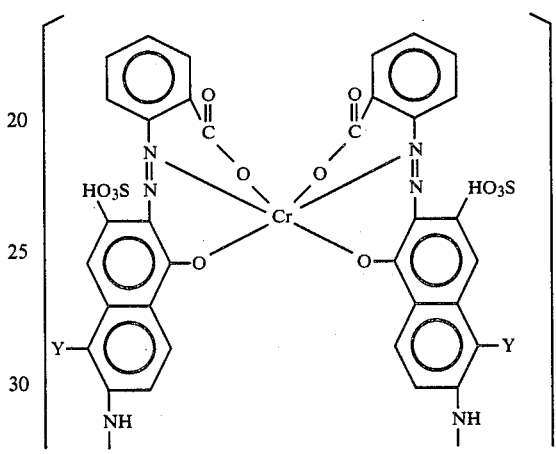

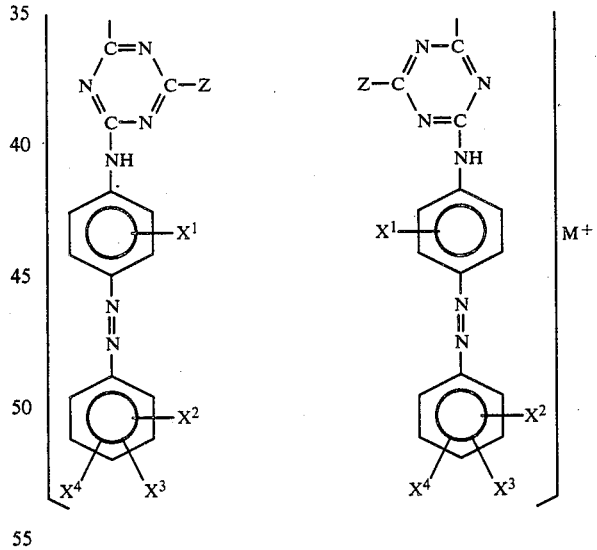

wherein $X^1$ represents hydrogen or methoxy; $X^2$ and $X^3$ and Y represent hydrogen; Z represents chlorine; $X^4$ represents sulfo; and M represents hydrogen or an alkali metal.

2. A chromium complex compound according to claim 1 which is represented by the formula:

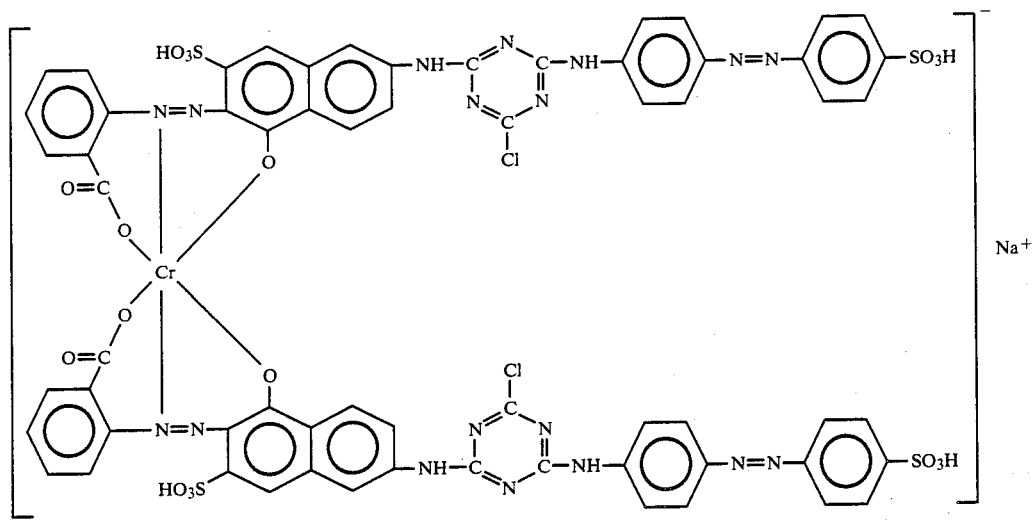
3. A chromium complex compound according to claim 1 which is represented by the formula:
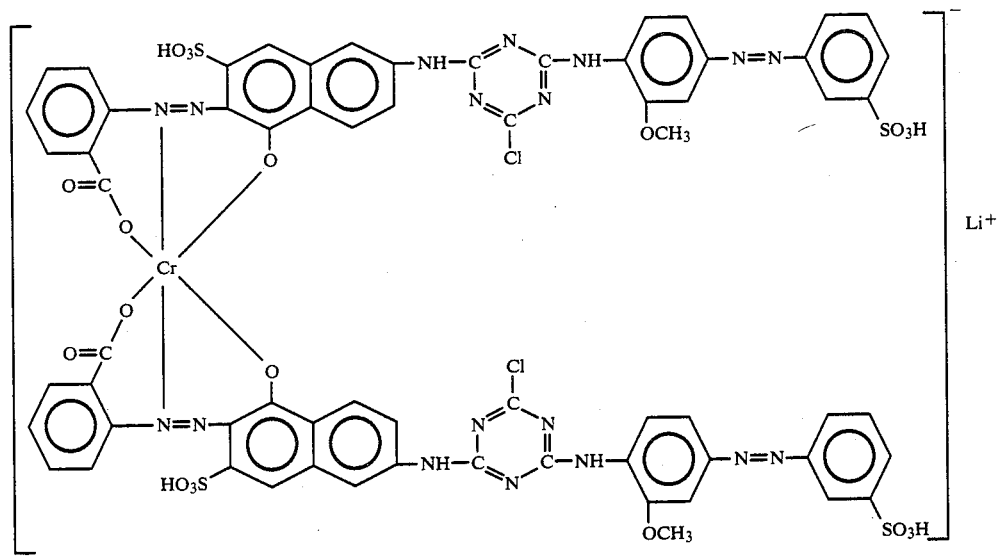
* * * * *